Sept. 6, 1949.         C. L. DAVIS                2,480,910
             DEVICE FOR CLEANING RAKES
                  Filed Feb. 10, 1948
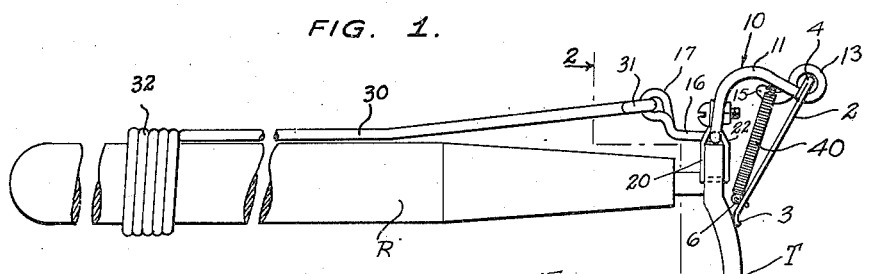
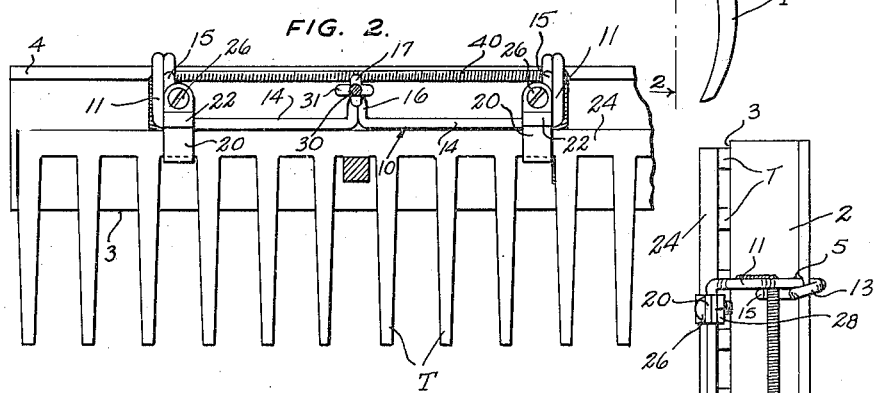
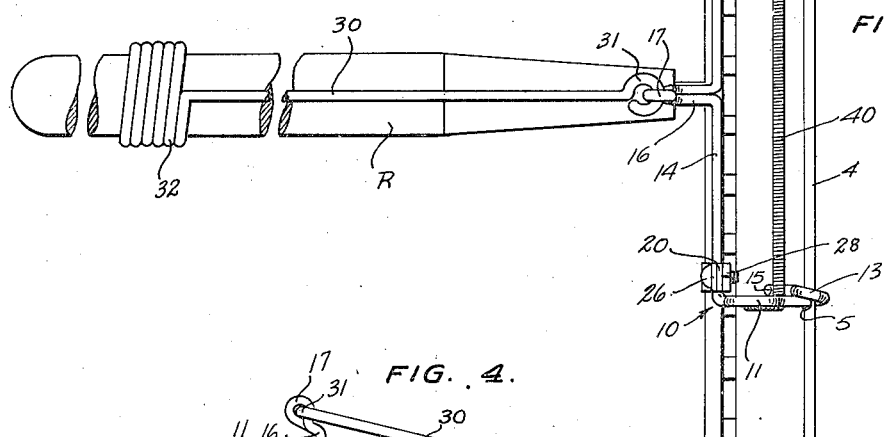
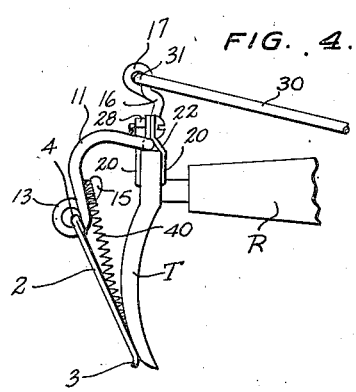
INVENTOR.
CLAUDE L. DAVIS.
BY
McMorrow, Berman + Davidson
ATTORNEYS.

Patented Sept. 6, 1949

2,480,910

UNITED STATES PATENT OFFICE 2,480,910

DEVICE FOR CLEANING RAKES

Claude L. Davis, Orange County, N. C., assignor of one-half to Roger B. Davis, Orange County, N. C.

Application February 10, 1948, Serial No. 7,418

4 Claims. (Cl. 56—400.10)

This invention relates to improvements in devices for facilitating the removal from garden rakes or similar implements of such debris as is ordinarily picked up thereby.

It is a particular object of the invention to provide a device of the type referred to which may be readily attached to practically any type of rake, and which by a simple and convenient operation will automatically remove leaves, papers, grass, or other debris which may have been picked up thereby. That is to say, the device is so constructed and arranged that by manipulation thereof, once assembled with a rake, such foreign material which inevitably becomes clogged between, or spiked onto, the teeth of the rake during use, may be quickly and handily disposed of. As will appear, the device of the invention may be easily associated with an ordinary garden rake, and is simple in form so as to be economical to manufacture.

Various other objects and advantages of the invention will be more fully described with reference to the accompanying drawings, wherein:

Figure 1 is a side elevational view of the device shown associated with a rake, parts of the rake handle being broken away, and the device being shown in its normal or retracted position;

Figure 2 is a transverse vertical sectional view taken substantially on the planes of the line 2—2 of Figure 1;

Figure 3 is a top plan view of the disclosure of Figure 1;

Figure 4 is a fragmentary side elevational view of the device in association with a rake, the device being in its advanced position at the end of a cleaning stroke.

Referring specifically to the drawings, wherein like reference characters have been used throughout to designate like parts, R designates a conventional rake handle having a conventional head detachably secured thereto in any suitable manner. The head comprises a transversely-extending back 24 from which depend a plurality of laterally-spaced teeth T. The particular structure of the rake including its head forms no part of the present invention.

There is a scraper blade member 2 which is coextensive in length with the width of the rake head and which is adapted to be moved vertically with respect to the forward faces of the teeth T. The blade member 2 is provided with a lower scraping edge 3 which rides the forward faces of the teeth T as the blade moves up and down with respect thereto. The upper edge 4 of the blade 2 may be doubled to give rigidity thereto, and such doubled portion is provided with a plurality of spaced apertures 5 therethrough, Figure 3. The rear surface of the blade 2 is provided with a plurality of eyes 6, Figure 1, the purpose of which will be described later.

The back 24 for the rake head has secured thereto on either side of the handle R a pair of clamp members 20 which are secured together by means of screws 26 and nuts 28. The clamp members 20 include complementary portions 22 located just above the back 24 which provide bearings when the clamps are in assembled position on the back 24. A bell crank, generally indicated at 10, includes a fulcrum-providing shaft portion 14, the outer ends of which are journaled in the bearing portions 22 of the clamps 20. Thus, the shaft portion 14 of the bell crank extends along the top of the back 24 for rotation thereon. The lateral outer ends of the shaft portion 14 are upwardly and forwardly directed, as at 11, to provide substantially identical forwardly-directed bell crank arms. The outer ends of the arms 11 extend through the apertures 5 in the blade 2 and are thereafter rearwardly looped, as at 13, over the upper edge 4 of the blade. Thereafter, the arms 11 terminate in rearwardly and upwardly-directed hooked free ends 15 for a purpose to be described later. An additional bell crank arm 16 extends rearwardly over the forward end of the handle R and terminates in an upwardly-directed loop 17, Figures 1 and 4. An actuating rod 30 extends along the handle R of the rake and has a front end pivotally secured to the loop 17 of the bell crank arm 16 in any suitable manner, as by the loop 31. The rear end of the actuating rod 30 comprises a plurality of turns 32 which extend around the rake handle R and provide a slidable mount on such rake handle for the rod 30.

A coil spring 40 has its free ends attached to the eyes 6 of the blade 2 and intermediate portions thereof are upwardly directed and supported on the hooked free ends 15 of the bell crank arms 11. The arrangement of parts is such that the spring 40 normally maintains the bell crank 10 and the blade 2 in the raised or retracted position illustrated in Figure 1, with the scraping edge free of the blade adjacent the back 24 of the rake head. However, when the actuating rod 30 is pushed forwardly, the bell crank 10 is rocked forwardly on the shaft portion 14, whereby the arms 11 move downwardly to the Figure 4 position. This action causes the scraping edge 3 to ride the forward faces of the teeth T, while at the same time, the blade 2 pivots on the loops 13 of the arms 11 and is extended relative thereto. This action stretches the spring 40, or at least those portions thereof between the hooks 15 and the eyes 6, as is clearly shown in Figure 4. Upon release of the actuating pressure on the rod 30, contraction of the spring 40 causes the parts to return to the Figure 1 position.

As illustrated in the drawings, the bell crank 10 may comprise a single length of stiff wire having an intermediate portion doubled to provide the bell crank arm 16. Such material lends itself particularly well to the construction of the bell crank arms 11 including the loops 13 and hooks 15.

While I have shown and described what is now thought to be the preferred embodiment of the invention, it is to be understood that the same is susceptible of other forms and expressions. Consequently, I do not limit myself to the precise structure shown and described hereinabove except as hereinafter claimed.

I claim:

1. In a garden rake cleaner, the combination with a garden rake including a handle, a rake head having a back extending transversely of said handle, and said back having a plurality of laterally-spaced teeth depending therefrom, of a scraper blade substantially coextensive in length with said head, said blade having a lower scraping edge and an upper edge, a bell crank including a shaft portion, means pivotally mounting said shaft portion on said back longitudinally of the same, said crank including a pair of laterally-spaced arms projecting forwardly of said head, means pivotally connecting said arms to said blade in the region of said upper edge, a coil spring including an intermediate portion and free ends, means mounting said intermediate portion on said bell crank arms, means connecting said free ends of said spring to said blade in the region of said lower edge, said bell crank having a third arm extending upwardly from said shaft portion in the region of said handle, said spring loading said blade and bell crank to a retracted position with said scraping edge bearing on said teeth in the region of said back, and means associated with said third arm and adapted to rock said bell crank and project said scraping edge downwardly along said teeth against the action of said spring.

2. In a garden rake cleaner, the combination with a garden rake including a handle, a rake head having a back extending transversely of said handle, and said back having a plurality of laterally-spaced teeth depending therefrom, of a scraper blade substantially coextensive in length with said head, said blade having a lower scraping edge and an upper edge, a bell crank including a shaft portion, means pivotally mounting said shaft portion on said back longitudinally of the same, said crank including a pair of laterally-spaced arms projecting forwardly of said head, said arms including rearwardly-directed end portions providing loops, said end portions terminating in upwardly-directed free ends providing hooks, means pivotally connecting said loops to said blade in the region of said upper edge, a coil spring including an intermediate portion and free ends, means mounting said intermediate portion on said hooks, means connecting said free ends of said spring to said blade in the region of said lower edge, said bell crank having a third arm extending upwardly from said shaft portion in the region of said handle, said spring loading said blade and bell crank to a retracted position with said scraping edge bearing on said teeth in the region of said back, and means associated with said third arm and adapted to rock said bell crank and project said scraping edge downwardly along said teeth against the action of said spring.

3. In a garden rake cleaner, the combination with a garden rake including a handle, a rake head having a back extending transversely of said handle, and said back having a plurality of laterally-spaced teeth depending therefrom, of a scraper blade substantially coextensive in length with said head, said blade having a lower scraping edge and an upper edge, a bell crank including a shaft portion, means pivotally mounting said shaft portion on said back longitudinally of the same, said crank including a pair of laterally-spaced arms projecting forwardly of said head, means pivotally connecting said arms to said blade in the region of said upper edge, a coil spring including an intermediate portion and free ends, means mounting said intermediate portion on said bell crank arms, means connecting said free ends of said spring to said blade in the region of said lower edge, said bell crank having a third arm extending upwardly from said shaft portion in the region of said handle, said spring loading said blade and bell crank to a retracted position with said scraping edge bearing on said teeth in the region of said back, a push rod extending along said handle, said push rod having a forward end, means pivotally connecting said forward end to said third arm of said bell crank, said push rod having a rear end formed to provide a coil concentrically and slidably disposed about said handle, and said push rod being operative upon being slid in one direction to rock said bell crank and project said scraping edge downwardly along said teeth against the action of said spring.

4. In a garden rake cleaner, the combination with a garden rake including a handle, a rake head having a back extending transversely of said handle, and said back having a plurality of laterally-spaced teeth depending therefrom, of a scraper blade substantially coextensive in length with said head, said blade having a lower scraping edge and an upper edge, a bell crank including a shaft portion, means pivotally mounting said shaft portion on said back longitudinally of the same, said crank including at least one bell crank arm extending forwardly of said shaft portion, means pivotally connecting said arm to said blade in the region of said upper edge, spring means, means connecting said spring means to said blade in the region of said lower edge, means connecting said spring means to said arm whereby to load said blade and bell crank to a retracted position with said lower edge of said blade bearing on said teeth in the region of said back, and means for rocking said bell crank against the action of said spring whereby to project said blade downwardly and cause said scraping edge thereof to scrape said teeth.

CLAUDE L. DAVIS.

REFERENCES CITED

The following references are of record in the file of this patent:

UNITED STATES PATENTS

| Number | Name | Date |
|---|---|---|
| 1,123,395 | Schooley | Jan. 5, 1915 |
| 1,133,729 | Lee | Mar. 30, 1915 |